United States Patent [19]
Cavallaro et al.

[11] Patent Number: 5,549,486
[45] Date of Patent: Aug. 27, 1996

[54] BATTERY DOCK FOR PORTABLE COMMUNICATION DEVICES

[75] Inventors: Eric S. Cavallaro, Indianapolis; Jay J. Adams, Noblesville; Stanton E. Troy, Kokomo; James R. Daugherty, Russiaville, all of Ind.

[73] Assignee: Delco Electronics Corporation, Kokomo, Ind.

[21] Appl. No.: 497,971

[22] Filed: Jul. 3, 1995

[51] Int. Cl.⁶ .................................................. H01R 3/00
[52] U.S. Cl. ............................................. 439/500; 439/929
[58] Field of Search .............................. 439/500, 919, 439/929; 320/2, 15

[56] References Cited

U.S. PATENT DOCUMENTS

| | | | |
|---|---|---|---|
| 5,030,129 | 7/1991 | Koch | 439/929 |
| 5,052,943 | 10/1991 | Davis | 439/929 |
| 5,189,358 | 2/1993 | Tomura et al. | 320/2 |
| 5,248,264 | 9/1993 | Long et al. | 439/929 |
| 5,256,955 | 10/1993 | Tomura et al. | 320/2 |

*Primary Examiner*—David L. Pirlot
*Assistant Examiner*—Brian J. Biggi
*Attorney, Agent, or Firm*—Jimmy L. Funke

[57] ABSTRACT

A cellular phone or other battery powered communication device is mounted on a vehicle support surface by a coupling comprising a pair of knobs extending from the surface and a fastener integrated with the replaceable battery of the phone. The fastener comprises a snap-on coupling which grips the knobs and a release tab which withdraws the coupling for phone removal. An electrical coupling on the support contacts terminals on the battery outer surface for connection to recharging and booster circuits.

10 Claims, 1 Drawing Sheet

BATTERY DOCK FOR PORTABLE COMMUNICATION DEVICES

FIELD OF THE INVENTION

This invention relates to a dock for attachment of a wireless communication device to a support and particularly to a fastener associated with the device battery for coupling to the support.

BACKGROUND OF THE INVENTION

In motor vehicles the use of cellular telephones and other wireless or portable communication devices is becoming common. Often such devices are loosely deposited on a vehicle seat or elsewhere without secure support on the vehicle. It is beneficial, however, to securely attach the device to a support in the vehicle in order to have a certain place to find the device when needed as well as for protection against falling or being thrown about the vehicle. Moreover, it is desirable to electrically couple the device to vehicle mounted means to charge the battery and to boost the communication signal for enhanced transmission.

Heretofore the communication devices have had features on the device for attachment in a vehicle; each manufacturer has its own attachment scheme so that there is no universal mounting standard. It has also been attempted to use plastic envelopes around the communication devices but these are bulky, expensive and hard to locate in a vehicle environment.

SUMMARY OF THE INVENTION

It is therefore an object of the invention to mount communication devices to a vehicle or other support through a standard coupling which does not require modification of the diverse designs of the devices per se. Another object is to electrically couple such devices to a vehicle with a standard connector which also does not require modification of the diverse designs of the devices per se.

A common element of communication devices is a nickel-cadmium battery which is rechargeable as well as replaceable. To facilitate the replacement, such batteries are commonly secured to the outer back of the device, and essentially form a portion of the device back housing. The batteries also commonly include electrical terminals for power, data and antenna. By providing a mounting device on the back or outer face of the battery for coupling to a mating part on the vehicle of other support the communication device can be mounted to the support, and in the same way the terminals can connect to mating terminals on the support.

The battery back includes a fastener having a pair of spaced apertures for snapping over a pair of mating knobs mounted on the support. The apertures are tapered outward to assist in installing the apertures over the knobs and the knobs themselves are chamfered around their outer ends to likewise assist in insertion into the apertures. The knobs also have enlarged heads carried by stems of smaller diameter. A slide plate within the fastener movable laterally by a bias spring engages the knobs beneath the heads when the knobs are inserted in the apertures. A release tab on the plate is manually operable against the spring action to withdraw the plate, releasing the knobs.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to a docking station for mounting a cellular telephone to a vehicle instrument panel, but it will be appreciated that the invention is applicable as well to the mounting of any battery operated communication device to a support.

Figure 1:
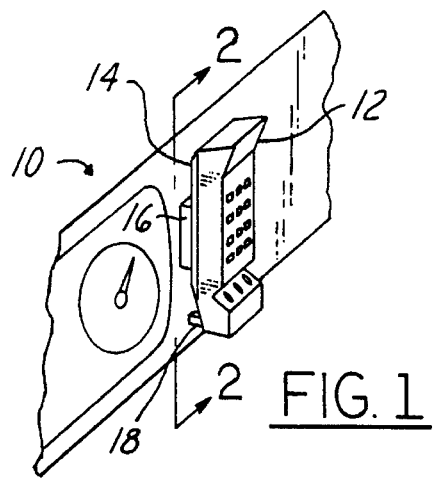
FIG. 1 is an isometric view of a portable telephone mounted on a vehicle instrument panel according to the invention.
Figure 2:
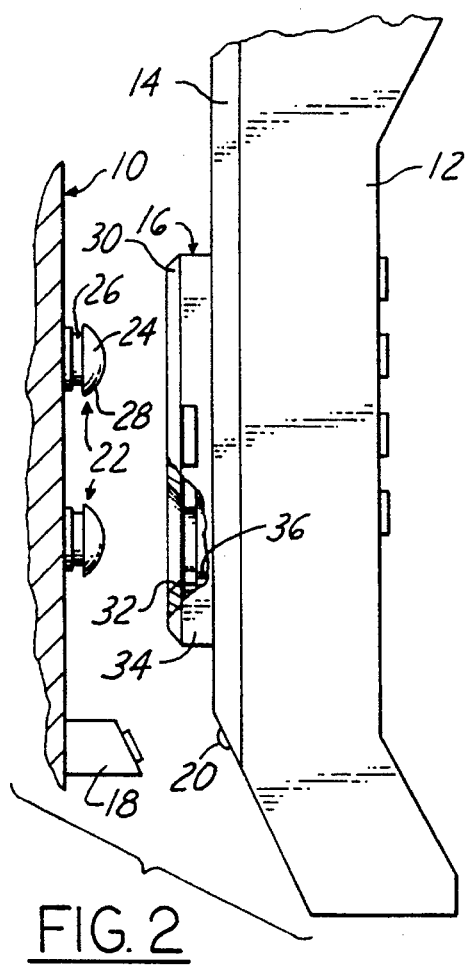
FIG. 2 is a side view of the telephone and sectional view of the instrument panel taken along line 2—2 of FIG. 1.

Referring to FIG. 1, a vehicle instrument panel 10 supports a cellular phone 12. Other convenient surfaces in the vehicle might be used as a support instead of the instrument panel. A battery 14 is attached to the rear of the phone 12 and comprises a part of the phone housing. As better shown in FIG. 2, a dock or fastener 16 on the outer face of the battery attaches to the instrument panel 10 to support the phone. An electrical coupling 18 extends from the instrument panel 10 to engage terminals 20 on the battery 14. The coupling 18 joins the phone to a charging circuit and a booster circuit (not shown) for signal transmission at a power higher than the capability of the phone alone. The battery 14, apart from the fastener 16, is a conventional nickel-cadmium battery which attaches to the back of the phone 12 and is easily replaceable. This battery, which is commercially available includes the terminals 20 on its rear face for recharging and for external data and antenna connections. Similar terminals (not shown) on the inner face of the battery make contact with the phone 12.

Figure 3:
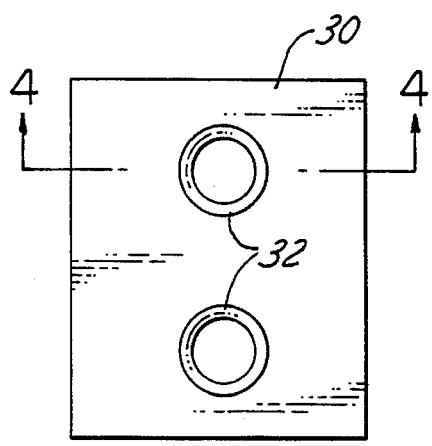
FIG. 3 is a view of a back plate of a fastener of FIG. 2 according to the invention.
Figure 4:
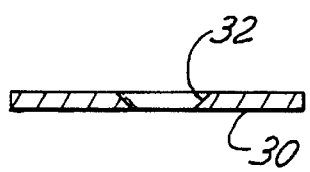
FIG. 4 is a sectional view of the plate of FIG. 3 taken alone line 4—4.

Mounting structure on the instrument panel 10 or other support comprise a pair of knobs 22 which extend out from the panel. Each knob 22 has an outer head 24 mounted on a stem 26 of smaller diameter. The outer rim 28 of each head is chamfered. The fastener 16 is formed as part of the battery and includes a cover plate 30, also shown in FIGS. 3 and 4, containing a pair of outwardly flared openings 32 configured to receive the knobs 22, the flared openings 32 and the chamfered rims 28 cooperating to guide the fastener onto the knobs when the phone is being attached to the panel. The fastener 16 further includes a base 34 which supports the cover plate 30 and has holes 36 aligned with the flared openings 32 for receiving the ends of the knobs 22.

Figure 6:
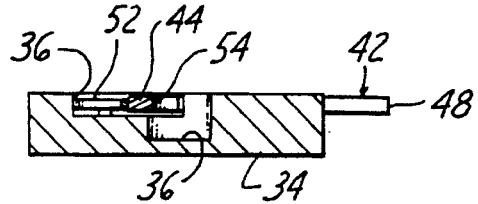
FIG. 6 is a sectional view of the fastener of FIG. 5 taken along line 6—6.
Figure 5:
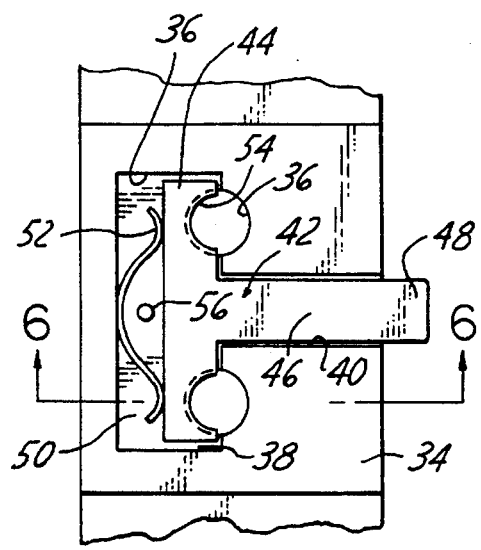
FIG. 5 is view of the fastener of FIG. 2 with the back plate removed.

The base 34 is best shown in FIGS. 5 and 6. The outer side of the base which engages the cover plate 30 contains a T-shaped recess 36 which has a head 38 intersecting the holes 36 and a stem portion 40 which extends to one side of the base. A slide plate 42 has a cross member 44 in the recess head 38 and a stem 46 extending through the recess stem portion 40 and terminating in a tab 48 which protrudes beyond the base 34 for manual access. The cross member 44 is narrower than the recess head 38 to define a space 50 between them. A curved leaf spring 52 in the space 50 bears against the cross member 44 to bias the slide plate 42 in the direction of the holes 36. Semicircular indentations 54 in the cross member are aligned with the holes 36 and overlap the holes sufficiently to engage the knobs 22 beneath the heads 24 at the stems 26, thereby gripping the knobs by reason of the spring bias when the fastener is mounted on the knobs, to prevent inadvertent removal. The slide plate 42 is slidably moved against the spring bias by pushing on the tab 48 to withdraw the plate from the knobs 22, thereby releasing the fastener 16 from the panel 10. A stop 56 in the space 50 limits the range of movement of the slide plate 42 when the tab 48 is depressed.

The proposed fastener design affords an easy snap-on coupling. When the phone 12 is pushed onto the knobs 22, the chamfered knob ends readily enter the flared openings 32 in the cover plate 30 and the chamfered knob ends also engage the indentations 54 in the slide plate to cam the slide plate against the spring bias to allow entry of the knobs into the holes 36. Then the slide plate snaps back into locking position to prevent disengagement until the tab 48 is depress to release the phone from the mount.

It will thus be seen that a simple inexpensive mount for a cellular phone or other portable communication device is afforded independently of the phone design by modifying the configuration of the device battery to include a fastener and by including knobs and an electrical coupling on the vehicle. Thus even an existing phone is easily updated to include the mounting dock by replacing the original battery with one including the fastener.

The embodiments of the invention in which an exclusive property or privilege is claimed are defined as follows:

1. A mounting system for a portable communication device for detachably securing the device to a support comprising:

a battery secured externally to the device; snap-on fastener means solely on the battery;

mating means on the support for coupling to the fastener means to secure the battery to the support; and one of the fastener means and the mating means including a release means for separating the fastener means and the mating means.

2. The invention as defined in claim 1 wherein the release means is incorporated in the fastener means.

3. The invention as defined in claim 1 wherein the mating means includes a male member and the fastener means comprises:

aperture means for receiving the mating means; and spring-biased retaining means for holding the male member in the aperture; and wherein the release means comprises a manually operable element coupled to the retaining means for withdrawing the retaining means from the mating means.

4. The invention as defined in claim 1 wherein:

the mating means comprises a pair of knobs, each having a stem attached to the support and an enlarged head;

the fastener means including a pair of apertures, each for receiving a knob, and spring-biased latch means for holding each head against removal; and the release means is manually operable to withdraw the latch means from the knobs to allow separation of the mating means and the fastener means.

5. The invention as defined in claim 4 wherein:

the latch means comprises a slide plate movable under spring bias into each aperture for engaging the knobs; and the release means comprises a tab on the slide plate exposed for manual access.

6. The invention as defined in claim 4 wherein:

each knob has a chamfered outer end; and the apertures having chamfered outer openings for guiding the knobs into the apertures.

7. The invention as defined in claim 5 including snap-on attachment means wherein:

each knob has a chamfered outer end for engaging and slidably displacing the slide plate upon engagement with the fastener means.

8. A mounting accessory for a portable communication device for detachably securing the device to a support comprising:

a battery secured externally to the device;

snap-on fastener means solely on the battery for attaching the battery to the support; and the fastener means including a release means for separating the battery from the support.

9. The invention as defined in claim 8 wherein the fastener means comprises:

a laterally sliding gripping plate for gripping a portion of the support; and a spring for biasing the gripping plate into engagement with the support portion.

10. The invention as defined in claim 9 wherein the release means comprises a tab on the plate accessible for manipulation to slide the plate against the bias of the spring.

* * * * *